United States Patent [19]

Greenlee et al.

[11] Patent Number: 5,157,076

[45] Date of Patent: Oct. 20, 1992

[54] THERMOPLASTIC ELASTOMERS WITH IMPROVED ABRASION RESISTANCE

[75] Inventors: William S. Greenlee; Josef C. Vyvoda; Roman W. Wypart, all of Avon Lake, Ohio

[73] Assignee: The B.F. Goodrich Company, Brecksville, Ohio

[21] Appl. No.: 719,068

[22] Filed: Jun. 17, 1991

Related U.S. Application Data

[63] Continuation of Ser. No. 447,488, Dec. 7, 1989, abandoned.

[51] Int. Cl.$^5$ .............. C08L 55/02; C08L 9/02; C08L 27/06; C08F 259/04
[52] U.S. Cl. .................... 525/83; 525/238; 525/239; 525/317
[58] Field of Search ............ 525/317, 239, 83, 238

[56] References Cited

U.S. PATENT DOCUMENTS

| | | | |
|---|---|---|---|
| 2,786,785 | 3/1957 | Wise | 525/239 |
| 3,522,330 | 7/1970 | Montgomery | 525/239 |
| 3,851,016 | 11/1974 | Nicolet et al. | 525/317 |
| 4,127,618 | 11/1978 | Sutherland | 525/317 |
| 4,337,324 | 6/1982 | Yusa et al. | 525/239 |
| 4,659,766 | 4/1987 | Falk et al. | |

FOREIGN PATENT DOCUMENTS

| | | | |
|---|---|---|---|
| 223718A | 6/1985 | Fed. Rep. of Germany | 525/317 |
| 60-148408 | 1/1987 | Japan | |
| 513048 | 5/1976 | U.S.S.R. | 525/317 |

OTHER PUBLICATIONS

Ser. No. 242,395 filed Sep. 9, 1988, Greenlee et al.
Ser. No. 242,394 filed Sep. 9, 1988, Greenlee et al.

Primary Examiner—James J. Seidleck
Assistant Examiner—W. R. H. Clark
Attorney, Agent, or Firm—George A. Kap; William F. Prout

[57] ABSTRACT

In a preferred embodiment, the invention herein relates to blends of a PVC-containing thermoplastic material and an impact modifier which blends have improved abrasion resistance and a reduced adhesion to glass, said impact modifier has Shore A hardness greater than 70 and is used in an amount of greater than 50 weight parts per 100 weight parts of said thermoplastic material.

16 Claims, No Drawings

THERMOPLASTIC ELASTOMERS WITH IMPROVED ABRASION RESISTANCE

This is a continuation of copending application Ser. No. 07/447,488 filed on Dec. 7, 1989, now abandoned.

BACKGROUND OF THE INVENTION

This invention Pertains to compositions which have improved abrasion resistance and comprise per 100 weight parts of a thermoplastic material or resin an impact modifier in amount greater than 20 weight parts, preferably greater than 30 weight parts, more preferably greater than 50 weight parts, and especially about 100 to 500 weight parts. The impact modifiers have Shore A hardness of greater than 40, preferably greater than 60, more preferably greater than 70, and especially greater than 80. This invention pertains to the use of rigid, semi-rigid, and flexible thermoplastic materials, with and without plasticizers. The improved abrasion resistance of the compositions herein is less than 0.20 gram loss, preferably less than 0.15 gram loss, when flexible and semi-rigid thermoplastic elastomers are used in the compositions of this invention and less than 0.250 gram loss, preferably less than 0.220 gram loss, when rigid thermoplastic materials are used. Abrasion herein is measured by the Taber Abrasion Method.

Rigid thermoplastic materials, such as polyvinyl chloride resins, generally contain less than about 10 weight parts of a plasticizer per 100 weight parts of the resin. Semi-rigid thermoplastic materials generally contain about 10 to 30 weight parts of a plasticizer per 100 weight parts resin. Flexible thermoplastic materials generally contain greater than 30 weight parts of a plasticizer per 100 weight parts resin. In terms of Shore A hardness, the rigid thermoplastic materials are considered to have a hardness of greater than about 90, semi-rigid thermoplastic materials have a hardness of about 80-90, and flexible thermoplastic materials have a hardness of less than about 80.

Thermoplastic elastomers are not completely cured or vulcanized and can be readily processed and reprocessed on conventional processing equipment. The reprocessability of thermoplastic elastomers compared to conventional elastomers which are thermoset results in a great reduction in loss due to scrap, with consequent economic benefit to the processor. A variety of thermoplastic elastomers have been introduced which include thermoplastic elastomeric polyesters, styrene block copolymers, and thermoplastic olefin-rubber blends. Typical of such materials are the styrene-butadiene-styrene block copolymers sold as Kraton ® brand thermoplastic elastomers by Shell Chemical and Hytrel ® brand polyesters sold by DuPont. Many of these thermoplastic elastomers have found applications in consumer goods such as in industrial applications such as in wire coating, hose and tubing, electrical connectors, and automotive parts.

U.S. Pat. No. 4,659,766 discloses compositions which allegedly have good solvent resistance, abrasion and compression set characteristics. Such compositions comprise 70 to 30 weight parts high rubber ABS graft copolymers, 30 to 70 weight parts polyvinyl chloride resin, and 45 to 65 weight parts plasticizers used for plasticizing polyvinyl chloride resin. Amount of plasticizers given in this patent is based on the sum of the ABS graft copolymer and polyvinyl choride resin. This equates to a minimum of 64 weight parts of the plasticizer per 100 weight parts of the polyvinyl chloride resin. The large amount of the plasticizer indicates that the polyvinyl chloride product is of the flexible type.

Japanese patent application 60-148,408, published Jan. 19, 1987, discloses flexible and semi-rigid compositions comprising 100 weight parts polyvinyl chloride resin having average polymerization of at least 2000, 20 to 200 weight parts ABS resin and a partially cross-linked acrylonitrile/butadiene copolymer, and 20 to 300 weight parts of a plasticizer composed of a linear alkyl ester of trimellitic acid. The compositions disclosed by this reference have excellent flexibility, heat resistance, cold resistance, and mechanical strength.

A companion case was refiled recently as a CIP for the same three inventors as herein, covering the compositions containing impact modifiers exclusively with vinyl chloride-acrylate copolymers as thermoplastic materials. In that companion case, the claimed compositions are believed to have exceptional low temperature properties. The parent case was filed Sep. 9, 1988 and bears Serial No. 242,394, and is entitled "Very Soft, Flexible, Plasticized Polyvinyl Chloride Compositions."

In the case Ser. No. 242,395 filed Sep. 9, 1988, and entitled "Flexible Blend Compositions Based On Overpolymers of Vinyl Chloride Polymers On Ethylene Copolymers", an invention is described which pertains to the addition of a plasticizing agent to an overpolymer produced by overpolymerizing vinyl chloride-based polymer onto an ethylene-based polymeric substrate. The resulting blends have improved oil swell and low temperature properties.

SUMMARY OF INVENTION

Thermoplastic elastomer compositions are prepared by blending a thermoplastic material selected preferably from vinyl chloride copolymers with an elastomeric impact modifier preferably selected from acrylonitrile-styrene overpolymerized over polybutadiene rubber in amount of 100 to 500 weight Parts per 100 weight parts of the thermoplastic material. Resulting thermoplastic elastomers have improved abrasion resistance and reduced adhesion to glass.

DETAILED DESCRIPTION OF INVENTION

By preparing physical blends of a thermoplastic material with an impact modifier described herein, compositions are obtained which are thermoplastic elastomers which have improved abrasion resistance and reduced adhesion to glass based on the force required to push a glass jar across the surface of the extruded samples of the material of this invention.

The thermoplastic materials suitable herein include rigid, semi-rigid, and flexible thermoplastics, with and without or devoid of plasticizers. Included are copolymers of vinyl chloride with any monomer known to copolymerize with vinyl chloride now or in the future and copolymers prepared by graft polymerization of polymers with vinyl chloride. Copolymers, as used herein, cover polymers of two or more monomers. Specific examples of comonomers which can be copolymerized with vinyl chloride include vinyl acetate, vinyl stearate, carbon monoxide, isobutylene, olefins and halogenated olefins of 2 to 20 carbon atoms, alkyl acrylates containing 1 to 20 carbon atoms, preferably 2 to 10, in the alkyl groups, and mixtures of such comonomers. Especially preferred are copolymers of vinyl chloride with 2-ethylhexyl acrylate.

The polyvinyl chloride thermoplastic materials include polyvinyl chloride homopolymers and vinyl chloride polymerized with one or more of the following monomers: esters of vinyl alcohol containing 1 to 20 carbon atoms in the acid portion used to make the ester such as vinyl stearate, vinyl epoxystearate, vinyl benzoate, and vinyl acetate; acrylates and methacrylates containing 1 to 20, preferably 2 to 10 carbon atoms in the alcohol group that is used to make the ester such as ethyl acrylate, butyl acrylate, 2-ethylhexyl acrylate; acrylonitrile, methacrylonitrile, and derivatives thereof; esters of unsaturated dicarboxylic acids such as maleates, fumarates, and itaconates; carbon monoxide; olefins containing 2 to 20, preferably 2 to 6 carbon atoms such as ethylene, propylene and isobutylene; diolefins containing 4 to 20, preferably 4 to 8 carbon atoms such as butadiene, isoprene and halogen derivatives thereof such as chloroprene; alkyl vinyl ethers such as vinyl isobutyl ether and cetyl vinyl ether; vinyl aromatics containing 8 to 30, preferably 8 to 16 carbon atoms such as styrene, alpha-methyl styrene, and halogenated derivatives thereof such as para-chlorostyrene; vinyl organometallics such as monovinyldiethyl tin laurate, trialkyl tin acrylate and methacrylate, trialkylvinyl tin, unsaturated trihydrocarbon phosphate esters, vinyl phosphonic acid, N-chlorophthalimide, poly-N-allyl substituted aminotriazine, N-substituted maleimide, vinyl pyridine, vinyl imidazole; alkenyl halides such as vinylidene chloride, vinyl bromide and fluoride, halogenated propenes, vinylidenechlorofluoride, dichloroethylene; allyl glycidyl ether; allyl esters of hydroxyalkanoic acids; dimethyl dicrotonate; chloroalydene; isopropenyl chloride; tetrafluoroethylene; norbornene acrylate; (cyanoethoxy) ethyl acrylate; and isopropenyl acetate.

PVC resins useful in the practice of this invention include copolymers of vinyl chloride containing up to 90 and preferably up to 70, and especially 30 to 60 weight percent of copolymerizable monomers. Methods for preparing the PVC polymers are also well known and such resins are widely available commercially in a variety of molding and extrusion grades.

Besides blends with polyvinyl chloride based polymers or resins, other thermoplastic materials are included herein. The other thermoplastics included herein include polyvinyl chloride/poly(ethylene-vinyl acetate) grafts, ethylene-vinyl acetate copolymers, ethylene-ethyl acrylate copolymers, ethylene-methyl acrylate copolymers, polyurethanes, polyamides, polyesters, polycarbonates, polyacrylonitrile and copolymers thereof, polyacrylates, chlorinated polyethylene, poiyarylates, poly(vinylidene chloride), polysiloxanes, polyphenylene oxides, polyethylene and copolymers thereof, polypropylene and copolymers thereof, polystyrene and copolymers thereof, and mixtures thereof.

For the polyvinyl copolymers, their molecular weight is measured in terms of inherent viscosity. Inherent viscosity for the polyvinyl chloride copolymers is from about 0.3 to about 4, desirably from about 0.5 to about 2.5, preferably is in the range of 0.6 to 2.2. The inherent viscosity is measured using cyclohexanone as the solvent. The copolymer is dissolved in the solvent at a concentration of 0.2 gram per 100 mls of cyclohexanone at 90° C. for 90 minutes and then measured with a viscometer in a water bath at 30° C.

Polymerization can be carried out at suitable temperatures with temperatures of from about 0° to 100° C. being suitable and from about 10° to about 85° C. being preferred. The amount of the initiator utilized is generally quite small as from about 0.001 parts by weight to about 1.0 parts by weight and preferably from about 0.005 to about 0.1 Part by weight for every 100 parts by weight of the total monomers being copolymerized.

Certain of the thermoplastics described herein, i.e., semi-rigid and flexible thermoplastics, desirably are not crosslinked so that they have good processing properties. However, it is to be understood that it is within the ambient of the present invention to either partially crosslink or crosslink the thermoplastics to provide improved physical properties. Should the thermoplastics be crosslinked or cured, any conventional crosslinking agent can be utilized such as diallyl phthalate, divinyl benzene, various diacrylates such as butanediol diacrylate, diethylene glycol diacrylate, and triacrylates such as trimethylolpropane triacrylate, trimethylolpropane trimethacrylate, and the like. Free radial initiators can also be used as crosslinkers.

The plasticizers useful in the practice of this invention include any of the plasticizers commonly used in the art with vinyl chloride resins. Typical plasticizers include ester plasticizers such as dialkyl phthalates and the like the phosphate plasticizers such as tri(alkylphenyl)-phosphates and the like, as well as a wide variety of plasticizers based on vegetable oils such as epoxidized soyabean oil and the like. Where less than 30% comonomer is used in preparing the thermoplastic material, the level of plasticizer suitable herein is 0 to 50 weight parts, preferably 0 to 30 weight parts per 100 weight parts thermoplastic material. Where more than 30% comonomer is used, level of plasticizer is 0 to 400 weight parts, preferably 0 to 200 weight parts.

The thermoplastic materials may further include antioxidants, stabilizers, fillers, pigments, lubricants, extenders, secondary plasticizers, flame retardants, dyes, and the like as is commonly Practiced in the compounding art.

The thermoplastic materials described herein can be prepared or polymerized in any conventional manner such as dispersion, emulsion, mass, solution, condensation polymerization, and the like with suspension being Preferred. Generally, for the polymers produced using free radical polymerization methods, polymerization is initiated with a free radical initiator such as an alkanoyl, aroyl, alkaroyl, or an aralkanoyl diperoxide, a monohydroperoxide, or an azo compound, a peroxy ester, a percarbonate, or any other suitable free radical-type initiator. Examples of specific initiators include benzoyl peroxide, lauroyl peroxide, diacetyl peroxide, cumene hydroperoxides, methyl ethylketone peroxide, diisopropylbenzene hydroperoxide, 2,4-dichlorobenzoyl peroxide, naphthoyl peroxide, t-butyl perbenzoate, di-t-butyl perphthalate, isopropyl percarbonate, acetyl cyclohexane sulfonyl peroxide, disecondary butyl peroxydicarbonate, t-butyl peroxyneodecanoate, di-normal propyl peroxydicarbonate, azo-bisisobutyronitrile, alpha, alpha'-azodiisobutyrate, 2,2'-azo-bis-(2,4-dimethyl valeronitrile), and the like.

The rubbers or elastomers of the present invention, which are also considered to be impact modifiers for polyvinyl chloride resins, are not cured or are only cured to a limited or partial extent. The terms "elastomer" and "rubber" are used interchangeably herein. Suitable impact modifiers or elastomers which should impart the desired properties to the compositions claimed herein include acrylonitrile-butadiene-styrene (ABS) elastomer copolymers and blends, acrylonitrilestyrene-acrylate (ASA) copolymers and blends, acrylonitrile-chlorinated polyethylene-styrene (ACS) copolymers and blends, styrene-acrylonitrile (SAN) copolymers, olefin modified SAN, styrene-acrylonitrile-EPDM or EPR where EPDM is a contraction of ethylene-propylene-diene monomer and EPR stands for ethylene-propylene rubber.

Typical of the preferred impact modifiers are the high rubber copolymers which are generally referred to as high rubber ABS resin, which may generally be described as graft copolymers of styrene and acrylonitrile on polybutadiene or styrene-butadiene rubbers containing greater than 50 weight % of a rubbery substrate, as well as the high rubber graft copolymers such as methylmethacrylate-styrene-acrylonitrile grafts on polybutadiene or styrene-butadiene rubbers. These resins are widely known and commercially available. Particularly preferred impact modifiers for purposes herein contain acrylonitrile, preferably in an amount greater than 3% by weight such as 5 to 40%, preferably 5 to 25%, based on the weight of the impact modifier. Any nitrile is suitable, however, acrylonitrile is preferred. An example of such an impact modifier is acrylonitrile-styrene copolymer overpolymerized over rubber such as polybutadiene. Specific example of such an impact modifier is Blendex* 338, a product of General Electric.

Shore A hardness of the impact modifiers suitable herein is greater than 60, preferably greater than 70, and especially greater than 80. The particularly preferred impact modifiers have Shore A hardness in the range of 70 to 95. Shore A hardness of the Blendex 338 impact modifier is 90. Shore A hardness was determined using the ASTM D-2240 instantaneous method. Amount of the impact modifiers per 100 weight parts of the thermoplastic is greater than 20 weight parts, preferably greater than 30 weight parts, more preferably greater than 50 weight parts, and especially about 100 to 500 weight parts. Particularly preferred amount of Blendex 338 impact modifier per 100 weight parts of copolymer of vinyl chloride and 2-ethylhexyl acrylate is 100 to 300 weight parts.

Using the H-18 wheel to determine abrasion by the Taber Abrasion Method, which measures abrasion in loss in grams per 1000 cycles, abrasion of compositions of this invention containing semi-rigid or flexible PVC thermoplastics is less than 0.20 gram of weight loss, preferably less than 0.15 gram. For compositions containing rigid grades of PVC thermoplastics, abrasion is less than 0.250 gram weight loss, preferably less than 0.220 gram loss. The compositions of this invention also have another advantage. It was discovered that the presence of the impact modifier in the composition reduces adhesion to glass based on the force required to push a glass jar across the surface of the extruded sample of the composition claimed herein.

The thermoplastic elastomer compositions of the present invention can be blended with the various additives in a Banbury mixer and then processed on a two-roll mill to produce a sheet which can be cubed and then extruded, injection molded, etc. The compositions of the present invention can also be mixed with the various additives in a high intensity mixer such as a Henschel mixer and then this powder compound can be processed on a two-roll mill into a sheet and cubed or the powder compound can be processed on an extruder into pellets or into a finished article. In general, any conventional compounding equipment such as a Banbury mixer, two-roll mill, extruder, injection molding machine, etc., can be used to produce the compositions of this invention.

The compositions of this invention containing the various fillers, additives, etc., can be processed by a variety of techniques including injection molding, extrusion, calendering, thermoforming, and the like. Suitable end use applications include gaskets, hoses, automotive, roofing membranes, dual durometer extrusions, weatherstrips, shoe soles, wire and cable jacketing, upholstery, tarpaulins, automotive roofing, floor mats, connectors for tubing, electrical, etc., tool handles, toys, small tires, wallcoverings, Pond liners, conveyor belts, shoe uppers, and flooring products.

The practice of this invention may be better understood by the following examples which are provided by way of illustration of the invention herein and not in limitation thereof.

EXAMPLE 1

Polymerization of vinyl chloride and 2-ethylhexyl acrylate

The polymerization vessel was charged with the following ingredients:

| | |
|---|---|
| Water | 2219 kg. |
| Vinyl chloride monomer | 888 kg. |
| 2-ethylhexyl acrylate | 592 kg. |
| Polyvinyl alcohol dispersant soln. | 32.75 kg. |
| Substituted cellulose dispersant soln. | 20.1 kg. |
| Initiator solution (75%) | 0.888 kg. |

The polyvinyl alcohol dispersant solution was in water and the polyvinyl alcohol concentration therein was 3.72%. The substituted cellulose solution was also in water and the cellulose concentration therein was 2.21%.

The vessel was charged with water and the dispersants first. After evacuation, the mixture of monomers was added and after the mixing of the contents, the temperature was adjusted to 55° C. Lastly, the initiator was added and the reaction started. The polymerization was carried out with agitation for 420 minutes after which time the reactor was cooled to room temperature. The polymeric product was transferred to a stripping vessel to remove unreacted monomers. After the stripping, the polymer was recovered by filtration and dried.

EXAMPLE 2

Using a resin similar to that given in Example 1, the blends listed in Table I were prepared. The blends using the polyvinyl chloride-acrylate copolymer were prepared by mixing the ingredients, including the impact modifier, on a heated 6"×13" two-roll mill with a mill temperature of 300° F for 8 minutes after banding. The blends or base formulations contained 100 weight parts of the copolymer; 0.5 weight part lubricant, 7.0 weight parts stabilizer and costabilizer, 0.5 weight part hindered phenolic antioxidant, and the impact modifier in the indicated amount. The product was then removed as a sheet from the mill and cut into 6"×6" plaques. The plaques were pressed using a two minute preheat and three minute press time at 320° F. The pressed plaques were then submitted for determination of the abrasion resistance which are summarized in Table I, below. The data was determined by the Taber Abrasion Test using an H-18 wheel.

Durastrength 200 impact modifier available from M&T Chemicals is believed to consist of a polymethyl methacrylate shell and a core of an acrylate elastomer. The shell in Durastrength 200 impact modifier is believed to be less than 50% by weight and the rubber core is more than 50% by weight. Blendex 338 impact modifier, available from General Electric, is non-weatherable and is believed to be acrylonitrile-butadiene-styrene or ABS polymer. Paraloid BTA 733 impact modifier, available from Rohm & Haas, is believed to be a polymer of methylmethacrylate, butadiene, and styrene. Paraloid KM 334 impact modifier, available from Rohm & Haas, is believed to consist of a methylmethacrylate copolymer shell and an acrylate elastomer core.

component and in the base formulation to emphasize and enhance particular physical properties such as in reduction of adhesion to glass and abrasion resistance through use of other thermoplastics, impact modifiers, different proportions of PVC and plasticizer, and selection of plasticizers as may be needed for a particular end-use. The compositions of this invention thus provide the compounder with a great degree of flexibility in meeting the requirements for use in a variety of widely differing applications.

The compositions of this invention are useful as thermoplastic elastomers in formulating molded and extruded consumer goods such as in shoe soling compositions, adhesives, hose and tubing and the like. As will be

TABLE I

|  | Control | | Formulation No. | | | | | |
|---|---|---|---|---|---|---|---|---|
|  | A | B | 1 | 2 | 3 | 4 | 5 | 6 |
| Copolymer of VC/2-EHA | 100.00 | → | → | → | → | → | → | → |
| Stabilizer and Costabilizer | 7.0 | → | → | → | → | → | → | → |
| Lubricant | 0.50 | → | → | → | → | → | → | → |
| Antioxidant | 0.50 | → | → | → | → | → | → | → |
| Filler | — | 20.0 | — | 20.0 | — | — | — | — |
| Impact Modifier | | | | | | | | |
| Durastrength 200 | — | — | — | — | — | — | — | 20.0 |
| Paraloid KM-334 | — | — | — | — | — | — | — | — |
| Blendex 338 | — | — | 20.0 | 20.0 | 50.0 | 200.0 | 300.0 | — |
| Paraloid BTA 733 | — | — | — | — | — | — | — | — |
| Taber Abrasion Resistance (gram loss) | 0.2234 | 0.3959 | 0.1433 | 0.2512 | 0.1395 | 0.0780 | 0.0833 | 0.2625 |
| Shore A Hardness | 61 | 67 | 69 | 74 | 76 | 86 | 88 | 69 |

|  | Formulation No. | | | | | | | |
|---|---|---|---|---|---|---|---|---|
|  | 7 | 8 | 9 | 10 | 11 | 12 | 13 | 14 |
| Copolymer of VC/2-EHA | → | → | → | → | → | → | → | → |
| Stabilizer and Costabilizer | → | → | → | → | → | → | → | → |
| Lubricant | → | → | → | → | → | → | → | → |
| Antioxidant | → | → | → | → | → | → | → | → |
| Filler | — | — | — | — | — | — | → | → |
| Impact Modifier | | | | | | | | |
| Durastrength 200 | 50.0 | 400.0 | — | — | — | — | → | → |
| Paraloid KM-334 | — | — | 20.0 | 50.0 | 400.0 | — | → | → |
| Blendex 338 | — | — | — | — | — | — | → | → |
| Paraloid BTA 733 | — | — | — | — | — | 20.0 | 50.0 | 400.0 |
| Taber Abrasion Resistance (gram loss) | 0.3154 | 0.5058 | 0.3092 | 0.2934 | 0.2943 | 0.3059 | 0.3370 | 0.3195 |
| Shore A Hardness | 76 | 91 | 72 | 80 | 90 | 69 | 76 | 85 |

The data in Table I show abrasion of 0.2234 gram loss for formulation control A without any filler nor any impact modifier and 0.3959 gram loss for formulation Control B with 20.0 weight parts of filler. At 50.0 weight parts of Blendex 338 impact modifier, abrasion was 0.1395 (Formulation #3) which compares with abrasion of 0.3154, 0.2934 and 0.3370 when 50.0 weight parts of Durastrength 200, Paraloid KM-334 and Paraloid BTA 733 impact modifiers were used in amount of 50.0 weight Parts (see Formulations #7, #10 and #13). Blendex 338 impact modifier is by far the best impact modifier tested and reflects the unexpected property of abrasion resistance when compared to the other tested impact modifiers and the corresponding Control A which had abrasion of 0.2234 gram loss.

The data also shows improved abrasion of 0.0780 gram loss (Formulation #4) when Blendex 338 impact modifier was used at a level of 200.0 weight parts.

A similar trend was also found in rigid PVC when the addition of these modifiers at the level of 100 weight parts gave abrasion values for Blendex 338, Durastrength 200, Paraloid KM-334 and Paraloid BTA 733 of 0.2058, 0.4546, 0.2551 and 0.2557, respectively.

It will be recognized by those skilled in the art that further modifications may be made in the thermoplastic recognized by those familiar with the compounding art, these compositions may further comprise additional thermoplastic resins, as well as antioxidants, stabilizers, dyes, pigments, lubricants, flame retardants, fillers, processing aids, extenders, secondary plasticizers and the like as needed for particular uses, and such further additions and modifications are thus contemplated as within the scope of the invention.

What is claimed is:

1. A composition having improved abrasion resistance comprising a thermoplastic material and greater than 20 weight parts of an impact modifier per 100 weight parts of said thermoplastic material, said impact modifier has Shore A hardness greater than 40, said impact modifier contains 5–40% by weight polymerized acrylonitrile; said abrasion resistance of said composition devoid of a filler is 0.1433 or less, as measured by the Tabor Abrasion Test using a H-18 wheel; and said thermoplastic material is selected from the group consisting of polyvinyl chloride homopolymers, vinyl chloride polymerized with up to 70 weight percent of at least one copolymerizable comonomer, polyvinyl chloride-poly(ethylene-vinyl acetate) grafts.

2. Composition of claim 1 wherein amount of said impact modifier is greater than 30 weight parts and said impact modifier has Shore A hardness greater than 60.

3. Composition of claim 2 wherein amount of said impact modifier is greater than 50 weight parts and its Shore A hardness is greater than 70.

4. Composition of claim 3 wherein said impact modifier contains a polymer selected from acrylonitrile-butadiene-styrene copolymers and blends thereof, acrylonitrile-styrene-acrylate copolymers and blends thereof, acrylonitrile-chlorinated polyethylene-styrene copolymers and blends thereof, styrene-acrylonitrile copolymers, olefin modified styrene-acrylonitrile copolymers, styrene-acrylonitrile-EPDM or EPR copolymers, and mixtures thereof, where EPDM stands for ethylene-propylene-diene monomer and EPR stands for ethylene-propylene rubber.

5. A composition having improved abrasion resistance comprising vinyl chloride polymer and an impact modifier containing 5-40% by weight polymerized acrylonitrile; amount of said impact modifier is greater than 20 weight parts per 100 weight parts of said vinyl chloride polymer; said impact modifier has Shore A hardness greater than 60; and said abrasion resistance of said composition devoid of a filler is 0.1433 or less as measured by the Tabor Abrasion Test using an H-18 wheel.

6. Composition of claim 5 containing from 0 to about 30 parts of plasticizer per 100 weight parts of said vinyl chloride polymer and said impact modifier is selected form acrylonitrile-butadiene-styrene copolymers and blends thereof, acrylonitrile-styrene-acrylate copolymers and blends thereof, acrylonitrile-chlorinated polyethylene-styrene copolymers and blends thereof, styrene-acrylonitrile copolymers, olefin modified styrene-acrylonitrile copolymers, styrene-acrylonitrile-EPDM or EPR copolymers, and mixtures thereof, where EPDM stand for ethylene-propylene-diene monomer and EPR stands for ethylene-propylene rubber.

7. Composition of claim 6 wherein said vinyl chloride polymer is selected from vinyl chloride homopolymers and copolymers wherein said copolymers are of vinyl chloride monomer and 30-60% by weight of at least one copolymerizable comonomer.

8. A composition having improved abrasion resistance comprising vinyl chloride polymer and an impact modifier comprising polymerized acrylonitrile and polymerized styrene; amount of said impact modifier is greater than 20 weight parts per 100 weight parts of said vinyl chloride polymer; said impact modifier has Shore A hardness greater than 60; and abrasion resistance, of said composition devoid of filler is 0.1433 or less, as measure by the Tabor Abrasion Test using an H-18 wheel.

9. Composition of claim 8 wherein said impact modifier is acrylonitrile-styrene copolymer overpolymerized over rubber.

10. Composition of claim 7 wherein said vinyl chloride polymer is copolymer of vinyl chloride monomer and at least one comonomer selected from 2-ethylhexyl acrylate, butyl acrylate, ethyl acrylate, isobutylene, propylene, ethylene, methyl acrylate, lauryl methacrylate, ethoxyethyl acrylate, and mixtures thereof.

11. Composition of claim 10 wherein amount of said comonomer(s) is about 30-60% by weight.

12. Composition of claim 8 which contains less than 10 parts plasticizer.

13. Composition of claim 8 wherein said vinyl chloride polymer is selected from vinyl chloride homopolymers and copolymers wherein said copolymers are of vinyl chloride monomer and 30-60% by weight of at least one copolymerizable comonomer.

14. Composition of claim 8 wherein vinyl chloride polymer is copolymer of vinyl chloride monomer and about 30-60% by weight 2-ethylhexyl acrylate and said impact modifier is acrylonitrile-butadiene-styrene copolymer.

15. Composition of claim 8 wherein vinyl chloride polymer is copolymer of vinyl chloride and at least one comonomer selected from 2-ethylhexyl acrylate, butyl acrylate, and mixtures thereof.

16. A composition having improved abrasion resistance consisting essentially of vinyl chloride polymer and greater than 20 weight parts impact modifier per 100 weight parts of said vinyl chloride polymer; abrasion of said composition devoid of filler is 0.1433 or less, as measured by the Tabor Abrasion Test using an H-18 wheel; said vinyl chloride polymer is selected from vinyl chloride homopolymers and vinyl chloride copolymers copolymerized with at lest on comonomer; and said impact modifier comprises polymerized acrylonitrile and polymerized styrene.

* * * * *